United States Patent (10) Patent No.: US 9,692,310 B2
Fujita et al. (45) Date of Patent: *Jun. 27, 2017

(54) POWER CONVERTER

(71) Applicant: FUJI ELECTRIC CO., LTD., Kawasaki-shi (JP)

(72) Inventors: Satoru Fujita, Akishima (JP); Ryuji Yamada, Hachioji (JP)

(73) Assignee: FUJI ELECTRIC CO, LTD., Kawasaki-shi (JP)

(*) Notice: Subject to any disclaimer, the term of this patent is extended or adjusted under 35 U.S.C. 154(b) by 338 days.

This patent is subject to a terminal disclaimer.

(21) Appl. No.: 14/453,804

(22) Filed: Aug. 7, 2014

(65) Prior Publication Data
US 2014/0346884 A1 Nov. 27, 2014

Related U.S. Application Data

(63) Continuation of application No. PCT/JP2012/003856, filed on Jun. 13, 2012.

(30) Foreign Application Priority Data

Mar. 15, 2012 (JP) ................................ 2012-058730

(51) Int. Cl.
H02M 5/458 (2006.01)
H02M 1/08 (2006.01)
(Continued)

(52) U.S. Cl.
CPC .............. H02M 5/458 (2013.01); H02J 9/062 (2013.01); H02M 1/08 (2013.01); H02M 1/10 (2013.01);
(Continued)

(58) Field of Classification Search
CPC ........... H02M 5/45; H02M 5/458; H02M 1/08
(Continued)

(56) References Cited

U.S. PATENT DOCUMENTS 5,045,989 A * 9/1991 Higaki .................... H02J 9/062
363/124
6,069,412 A 5/2000 Raddi
(Continued)

OTHER PUBLICATIONS

Extended European Search Report issued in European Appln. No. 12870882.3 mailed Feb. 23, 2017.
(Continued)

Primary Examiner — Jared Fureman
Assistant Examiner — Win Htun
(74) Attorney, Agent, or Firm — Rossi, Kimms & McDowell LLP

(57) ABSTRACT

A power converter that can supply constant voltage to a load even upon fluctuation of voltage of an AC power source includes an inverter circuit resulting from connecting switching elements in series, the inverter circuit being connected to both ends of a DC power source series circuit resulting from connecting in series two DC power sources; an AC output terminal that is connected to a connection point of the switching elements; another AC output terminal that is connected to a connection point of the DC power sources; and a bidirectional switch element including one end connected to the AC output terminal U and another end connected to a terminal of an AC power source.

17 Claims, 6 Drawing Sheets

(51) Int. Cl.
*H02J 9/06* (2006.01)
*H02M 1/10* (2006.01)
*H02M 5/293* (2006.01)
*H02M 1/00* (2006.01)
*H02M 1/32* (2007.01)

(52) U.S. Cl.
CPC ......... *H02M 5/293* (2013.01); *H02M 5/4585* (2013.01); *H02J 2009/063* (2013.01); *H02M 2001/0054* (2013.01); *H02M 2001/325* (2013.01); *Y10T 307/658* (2015.04)

(58) Field of Classification Search
USPC ................................. 307/43, 45, 66, 68, 72
See application file for complete search history.

(56) References Cited

U.S. PATENT DOCUMENTS

| | | | | |
|---|---|---|---|---|
| 6,160,722 | A * | 12/2000 | Thommes | H02J 9/061 307/68 |
| 6,483,730 | B2 | 11/2002 | Johnson | |
| 7,274,579 | B2 | 9/2007 | Ueda | |
| 7,391,132 | B2 | 6/2008 | Chen | |
| 2002/0118556 | A1* | 8/2002 | Johnson, Jr. | H02J 9/061 363/123 |
| 2006/0119184 | A1* | 6/2006 | Chen | H02J 9/062 307/66 |
| 2007/0241719 | A1* | 10/2007 | Itoh | H02M 7/5387 318/801 |
| 2008/0019155 | A1 | 1/2008 | Morishima | |
| 2010/0054002 | A1* | 3/2010 | Lu | H02J 9/062 363/37 |
| 2010/0109585 | A1* | 5/2010 | Iwahori | B60L 11/08 318/400.3 |
| 2010/0202168 | A1* | 8/2010 | Kanno | H02J 9/062 363/37 |
| 2011/0012543 | A1* | 1/2011 | Takizawa | B60L 3/003 318/139 |
| 2011/0260541 | A1* | 10/2011 | Huang | H02J 9/062 307/66 |

OTHER PUBLICATIONS

Yeh et al. "A Reconfigurable Uninterruptible Power Supply System for Multiple Power Quality Applications." Applied Power Electronics Conference and Exposition. Mar. 6, 2005:1824-1830. vol. 3. XP010809501.

Office Action issued in U.S. Appl. No. 14/454,284, mailed Oct. 20, 2016.

* cited by examiner

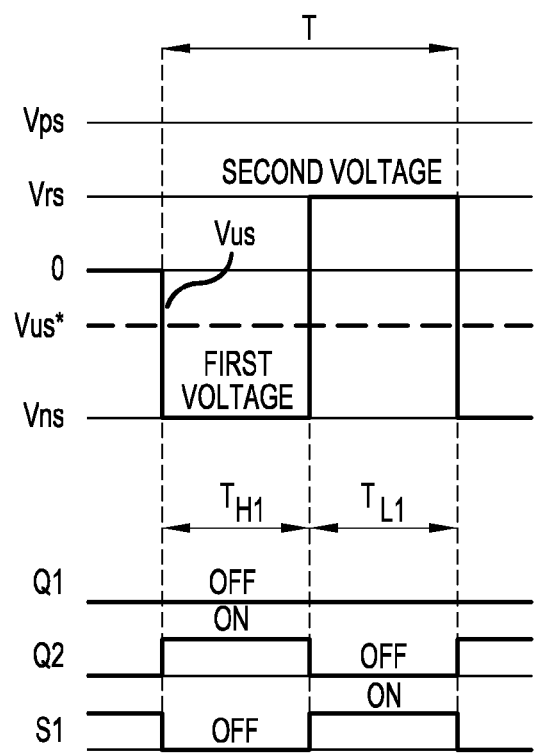
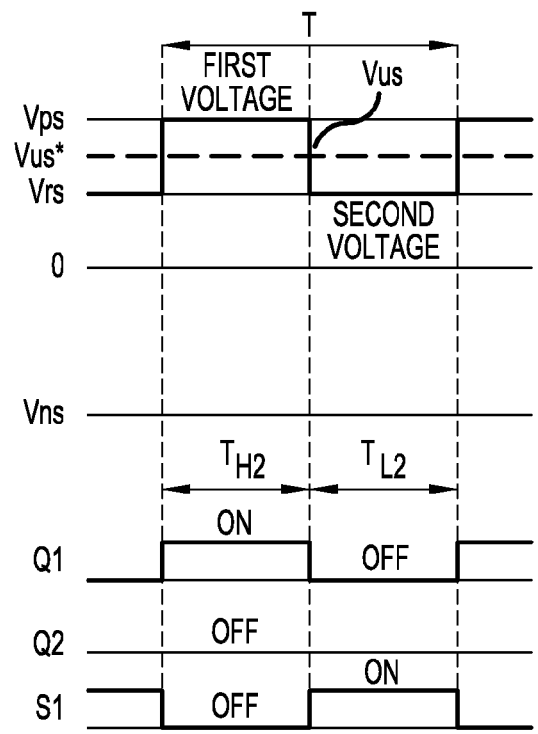

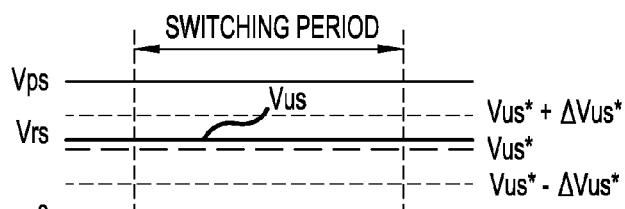
FIG.7
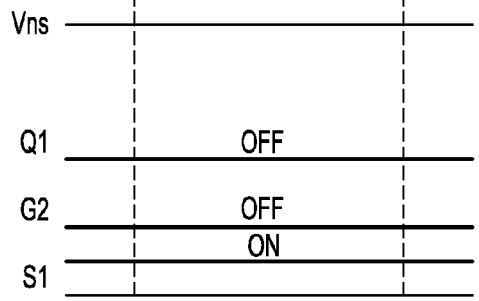

POWER CONVERTER

CROSS-REFERENCE TO RELATED APPLICATIONS

This application is a continuation of International Application No. PCT/JP2012/003856, filed on Jun. 13, 2012, and is based on and claims priority to Japanese Patent Application No. JP 2012-058730, filed on Mar. 15, 2012. The disclosure of the Japanese priority application and the PCT application in their entirety, including the drawings, claims, and the specification thereof, are incorporated herein by reference.

BACKGROUND

Field of the Invention

Embodiments of the present invention relate to a power converter that generates predefined AC voltage using voltage of an AC power source and a DC power source. More particularly, embodiments of the present invention relate to an instantaneous voltage-drop compensation device and an uninterruptible power source device that can supply stabilized voltage to a load, even upon occurrence of fluctuation of voltage of an AC power source and power failure in the AC power source.

Discussion of the Background

FIG. 10 is a diagram for explaining a power converter of a continuous-inverter power feeding scheme disclosed in Japanese Patent Application Publication No. H7-337036 ("JP H7-337036"). The power converter converts temporarily the voltage of an AC power source to DC voltage, converts the DC voltage again to AC voltage, and supplies the voltage to a load.

In the figure, the reference symbol 1 is a single-phase AC power source, 2 is a capacitor, 3 is a converter circuit, 4 is an inverter circuit, 5 is a filter circuit, and 6 is a load. One end of the AC power source 1 is connected to an AC input terminal of the converter circuit 3.

The AC input terminal of the converter circuit 3 is connected to one end of the AC power source 1. In the converter circuit 3, one end of a reactor L is connected to the AC input terminal. The other end of the reactor L is connected to a connection midpoint of a switching element series circuit, in which switching elements Qp, Qn are connected in series. A capacitor series circuit in which capacitors Cp, Cn are connected in series, is connected to both ends of the switching element series circuit. The connection midpoint of the capacitor series circuit is connected to the other end of the AC power source 1. The converter circuit 3 turns the switching elements Qp, Qn on and off, to rectify the voltage of the AC power source 1, and charge the capacitors Cp, Cn to a predefined voltage. The capacitors Cp, Cn thus charged to a predefined voltage form a DC power source.

The capacitor 2 is connected between the AC input terminal of the converter circuit 3 and the connection midpoint of the capacitor series circuit. The inverter circuit 4 comprises series-connected switching elements Q1, Q2. The inverter circuit 4 is connected to a DC output terminal of the converter circuit 3. The inverter circuit 4 turns on and off the switching elements Q1, Q2, to convert, to AC voltage, the voltage of the DC power source that comprises the capacitors Cp, Cn.

The filter circuit 5 is configured through connection in series of a reactor Lf1 and a capacitor Cf1. One end of the filter circuit 5 is connected to the connection midpoint of the switching elements Q1, Q2. The other end of the filter circuit 5 is connected to the connection midpoint of the capacitor series circuit. The filter circuit 5 removes a high-frequency component from the AC voltage that is outputted from the inverter circuit 4.

One end of the load 6 is connected to the connection point of the reactor Lf1 and the capacitor Cf1. The other end of the load 6 is connected to the other end of the AC power source 1. The AC voltage that is supplied from the inverter circuit 4 is outputted, via the filter circuit 5, to the load 6.

FIG. 11 is a diagram for explaining a power converter of a continuous commercial-power feeding scheme disclosed in Japanese Patent Application Publication No. H11-178216 ("JP H11-178216"). In the figure, a switch 7 and the secondary winding of a transformer 8 are connected in series between an AC power source 1 and a load 6. The respective connection relationships between a converter circuit 3, an inverter circuit 4, a filter circuit 5 and a capacitor 2 are identical to those of FIG. 10. An AC input terminal of the converter circuit 3 is connected to one end of the primary winding of the transformer 8. The connection midpoint of the capacitor series circuit is connected to the other end of the AC power source 1 and is connected to the other end of the primary winding of the transformer 8. The connection point of the reactor Lf1 and the capacitor Cf1 is connected to one end of the load 6.

The power converter ordinarily supplies voltage of the AC power source 1 to the load 6. When the voltage of the AC power source 1 drops, the converter circuit 3 turns on and off the switching elements Qp, Qn, to generate thereby compensation voltage for compensating the voltage drop from the DC voltage at which the capacitor series circuit is charged. The compensation voltage is superimposed on the voltage of the AC power source 1, via the transformer 8. The voltage resulting from superimposing the compensation voltage on the voltage of the AC power source 1 is supplied to the load 6. Charging of the capacitor series circuit is carried out in this case by the inverter circuit 4.

The switch 7 is opened when the AC power source 1 fails. The inverter circuit 4 turns on and off the switching elements Q1, Q2, to convert the DC voltage of the capacitor series circuit to AC voltage, and supply the voltage to the load 6.

In the power converter illustrated in FIG. 10, however, AC-DC voltage conversion by the converter circuit 3 and DC-AC voltage conversion by the inverter circuit 4 are required until AC voltage is supplied from the AC power source 1 to the load 6. The current that flows through the power converter passes at least once through each switching element of the converter circuit 3 and the inverter circuit 4. That is, the current flowing in the power converter passes through switching elements at least two or more times. Accordingly, respective conduction losses derived from passage of current through the switching elements occur at both the converter circuit 3 and of the inverter circuit 4.

The on and off operations of the switching elements Qp, Qn, Q1, and Q2 in the converter circuit 3 and the inverter circuit 4 are performed on the basis of the voltage of the DC power source that comprises the capacitors Cp and Cn. Accordingly, switching loss occurs when each element is turned on or turned off.

The power loss, including conduction loss and switching loss, in the switching elements is therefore substantial in the technology disclosed in JP H7-337036. A problem arises herein in that the conversion efficiency of the power converter drops when power loss in the switching elements is large.

In the power converter illustrated in FIG. 11, the transformer 8 is required in order to compensate for the voltage drop of the AC power source 1. The size of the transformer 8 is large, since the latter must function at a commercial frequency. In the power converter illustrated in FIG. 11, moreover, the operations of the converter circuit 3 and the inverter circuit 4 must be switched in order to supply predefined AC voltage to the load 6 when a power failure occurs in the AC power source 1.

A problem arises therefore, in the technology disclosed in JP H11-178216, in that a large commercial transformer is required, which translates into a power converter of large size. A further problem is the occurrence of disturbances in the AC output voltage as a result of switching over between the operations of the converter circuit 3 and the inverter circuit 4.

SUMMARY

Embodiments of the present invention provide a power converter that can output AC output voltage, without occurrence of disturbances, during a voltage drop of an AC power source or during power failure in the AC power source.

Embodiments of the present invention also provide a power converter that allows reducing power loss.

Embodiments of the present invention also provide a power converter that requires no commercial-frequency transformer to perform a voltage compensation operation.

A first means for solving the problems and attaining thereby the above goal is used in a power converter that outputs AC voltage on the basis of an AC output voltage command. The power converter comprises a single-phase AC power source having a first AC terminal and a second AC terminal; and a DC power source series circuit, resulting from connecting in series a first DC power source and a second DC power source such that a neutral terminal, which is a connection point of the first DC power source and the second DC power source, is connected to the second AC terminal. Further, the power converter is provided with: a switching element series circuit resulting from connecting in series a positive-side switching element that is connected to a positive-side terminal of the DC power source series circuit, and a negative-side switching element that is connected to a negative-side terminal of the DC power source series circuit; a first AC output terminal connected to a connection point of the positive-side switching element and the negative-side switching element; a second AC output terminal connected to the neutral terminal; and a bidirectional switch element one end of which is connected to the first AC output terminal and the other end of which is connected to a first AC terminal of the AC power source. At each control period resulting from dividing one period of the AC output voltage command into a plurality of control periods each having a pre-established time width, the power converter outputs, as a first voltage, a voltage of one level selected from among three levels of voltage of a positive-side voltage of the DC power source series circuit, a negative-side voltage of the DC power source series circuit, and a voltage of the AC power source, and outputs, as a second voltage, the voltage of another level selected from among the three levels of voltage. At each control period, moreover, the power converter complementarily outputs the first voltage and the second voltage to the first AC output terminal, over respective predefined time widths.

In the power converter having the first means for solving the problems applied thereto, the first voltage and the second voltage are voltages selected on the basis of the AC output voltage command and the voltage of the AC power source.

A second means for solving the problems is used in a power converter that outputs AC voltage on the basis of an AC output voltage command. The power converter comprises a single-phase AC power source having a first AC terminal and a second AC terminal; and a DC power source series circuit, resulting from connecting in series a first DC power source and a second DC power source such that a neutral terminal, which is a connection point of the first DC power source and the second DC power source, is connected to the second AC terminal. Further, the power converter comprises a switching element series circuit resulting from connecting in series a positive-side switching element that is connected to a positive-side terminal of the DC power source series circuit, and a negative-side switching element that is connected to a negative-side terminal of the DC power source series circuit; a first AC output terminal connected to a connection point of the positive-side switching element and the negative-side switching element; a second AC output terminal connected to the neutral terminal; and a bidirectional switch element one end of which is connected to the first AC output terminal and the other end of which is connected to a first AC terminal of the AC power source. Herein, at each control period resulting from dividing one period of the AC output voltage command into a plurality of control periods each having a pre-established time width, the power converter selects, as the first voltage, a negative voltage of the DC power source series circuit, and selects, as the second voltage, a voltage of the AC power source, when the AC output voltage command is equal to or lower than the voltage of the AC power source. Further, the power converter selects, as the first voltage, a positive voltage of the DC power source series circuit, and selects, as the second voltage, the voltage of the AC power source, when the AC output voltage command is higher than the voltage of the AC power source. Further, the power converter complementarily outputs the first voltage and the second voltage to the first AC output terminal, over respective predefined time widths.

In a power converter having applied thereto either the first means for solving the problems or the second means for solving the problems, an output time of the first voltage is established on the basis of the AC output voltage command, the first voltage and the second voltage. In this power converter an output time of the second voltage is a time resulting from subtracting the output time of the first voltage from the time of each control period.

In a power converter having applied thereto either the first means for solving the problems or the second means for solving the problems, alternatively, an output time of the first voltage is set to a time corresponding to a value obtained by dividing a difference voltage between the AC output voltage command and the second voltage by a difference voltage between the first voltage and the second voltage. In this power converter an output time of the second voltage is a time resulting from subtracting the output time of the first voltage from the time of each control period.

In a power converter having applied thereto either the first means for solving the problems or the second means for solving the problems, alternatively, an average value of the AC voltage that is outputted within each control period is equal to an average value of the AC output voltage command within that control period.

In a power converter having applied thereto either the first means for solving the problems or the second means for solving the problems, the AC output voltage command is synchronized with the voltage of the AC power source.

In a power converter having applied thereto either the first means for solving the problems or the second means for solving the problems, the AC output voltage command is asynchronous with the voltage of the AC power source.

In a power converter having applied thereto either the first means for solving the problems or the second means for solving the problems, the power converter outputs the voltage of the AC power source to the first AC output terminal in a control period in which a deviation between the voltage of the AC power source and the AC output voltage command lies within a pre-established range, regardless of the magnitude relationship between the AC output voltage command and the voltage of the AC power source.

The power converter in which the present invention is used allows outputting voltage of one level selected from among three levels of voltages, namely the positive-side voltage of the DC power source series circuit, the negative-side voltage of the DC power source series circuit and the voltage of the AC power source. Herein, current need only pass through a bidirectional switch element during output of the voltage of the AC power source. The power converter in which the present invention is used allows reducing the voltage that is applied to switching elements and bidirectional switch elements.

Therefore, the power converter in which the present invention is used allows reducing power loss generated in switching elements and bidirectional switch elements. In each control period resulting from dividing a period of an AC output voltage command into a plurality of control periods, the power converter in which the present invention is used sets, as a first voltage, a voltage that is close to the AC output voltage command, from among a positive-side voltage and a negative-side voltage of a DC power source series circuit, sets a voltage of the AC power source to a second voltage, and outputs the first voltage and the second voltage over respective predefined times. A desired AC voltage can be generated as a result.

Therefore, the power converter in which the present invention is used allows outputting AC voltage in which fluctuations of a power source voltage are compensated, even when no commercial-frequency transformer is utilized.

BRIEF DESCRIPTION OF THE DRAWINGS

FIGS. 5A, 5B, 5C, and 5D are diagrams for explaining AC output voltage in domain 1.

FIGS. 6A, 6B, 6C, and 6D are diagrams for explaining AC output voltage in domain 2.

FIG. 7 is a diagram for explaining another relationship between domain determination, a pulse width command α, and element selection.

FIGS. 8A, 8B, 8C, and 8D are diagrams for explaining AC output voltage in domain 3.

DESCRIPTION OF ILLUSTRATED EMBODIMENTS

Embodiments of the power converter of the present invention are explained in detail next with reference to FIG. 1 to FIG. 9. The power converter illustrated in FIG. 1 to FIG. 9 can be used in devices for supplying stable voltage to a load, even upon occurrence of voltage fluctuation of an AC power source or power failure of the AC power source, for instance in instantaneous voltage-drop compensation devices, uninterruptible power source devices, and the like.

Figure 1:
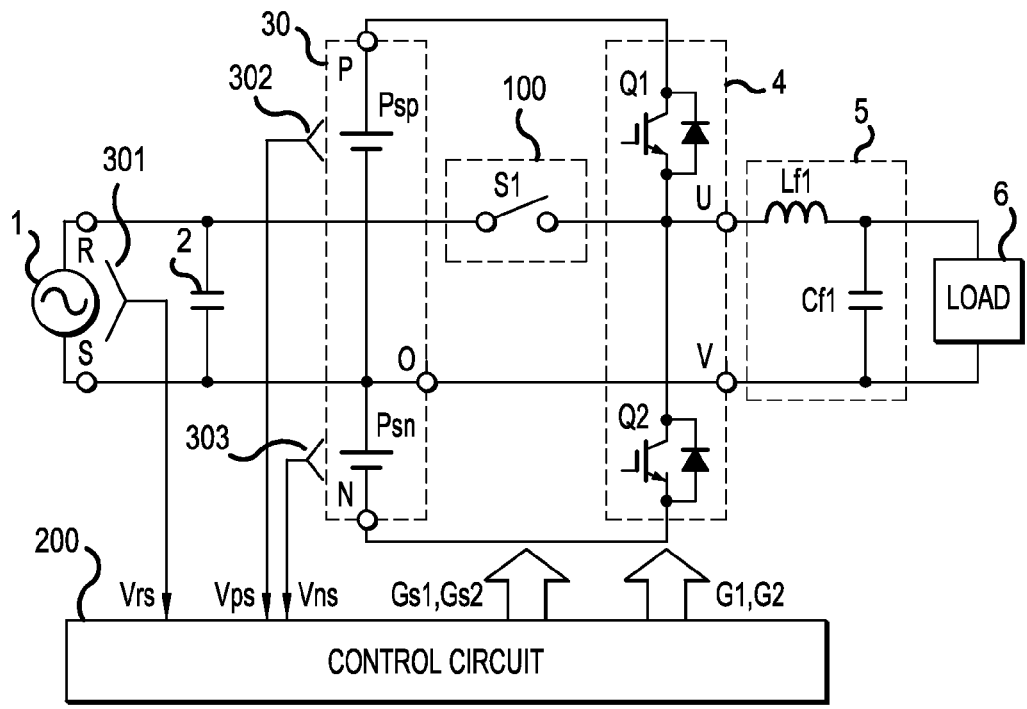
FIG. 1 is a circuit diagram according to an embodiment of the present invention.

FIG. 1 is a diagram for explaining a power converter according to an embodiment of the present invention. The power converter according to this embodiment generates three levels of voltage using the voltage of an AC power source and the voltage of a DC power source series circuit resulting from connecting two DC power sources in series.

In the figure, the reference symbol 1 is an AC power source, the reference symbol 2 is a capacitor, the reference symbol 30 is a DC power source series circuit, the reference symbol 4 is an inverter circuit, the reference symbol 5 is a filter circuit, the reference symbol 6 is a load, the reference symbol 100 is a bidirectional switch circuit, and the reference symbol 200 is a control circuit.

The AC power source 1 is a single-phase AC power source having a terminal R and a terminal S. A capacitor 2 is connected between the terminal R and the terminal S of the AC power source 1.

The DC power source series circuit 30 is a DC power source resulting from connecting a DC power source Psp and a DC power source Psn in series. The DC power source Psp is a positive-side DC power source. One end of the DC power source Psp is a positive-side terminal P that outputs voltage of positive polarity. The DC power source Psn is a negative-side DC power source. One end of the DC power source Psn is a negative-side terminal N that outputs voltage of negative polarity. A series connection point of the DC power source Psp and the DC power source Psn is a neutral terminal O and is connected to the terminal S of the AC power source 1.

The inverter circuit 4 is connected between the positive-side terminal P and the negative-side terminal N of the DC power source series circuit 30. The inverter circuit 4 is configured in the form of a switching element series circuit. The switching element series circuit is a circuit resulting from connecting in series a switching element Q1, one end of which is connected to the positive-side terminal P of the DC power source series circuit 30, and a switching element Q2, one end of which is connected to the negative-side terminal N.

The series connection point of the switching element Q1 and the switching element Q2 is connected to an AC output terminal U (first AC output terminal) for outputting single-phase AC voltage from the inverter circuit 4. The neutral terminal O of the DC power source series circuit 30 is connected to an AC output terminal V (second AC output terminal) for outputting single-phase AC voltage from the inverter circuit 4.

The bidirectional switch circuit 100 comprises a bidirectional switch element S1. One end of the bidirectional switch element S1 is connected to the AC output terminal U, and the other end is connected to the terminal R of the AC power source 1.

The AC output terminals U, V are connected to the load 6 via the filter circuit 5. The filter circuit 5 removes the harmonic component in the AC voltage that is outputted from the inverter circuit 4.

Figure 2A:
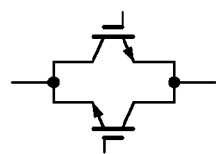
FIGS. 2A, 2B, 2C, and 2D show bidirectional switch elements according to embodiments of the invention.
Figure 2B:
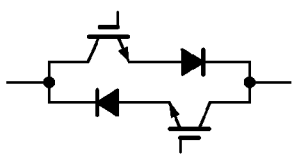
Figure 2C:
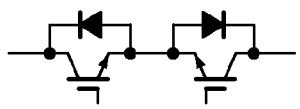
Figure 2D:
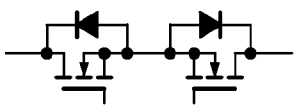

FIGS. 2A, 2B, 2C, and 2D illustrate configuration examples of the bidirectional switch element S1. The bidirectional switch element illustrated in FIG. 2A is configured through anti-parallel connection of two reverse blocking-type IGBTs (Insulated Gate Bipolar Transistors). The bidirectional switch element illustrated in FIG. 2B is configured through anti-parallel connection of two sets of switch elements in which diodes and IGBTs having no reverse-blocking breakdown voltage are connected in series. The bidirectional switch element illustrated in FIG. 2C is configured through anti-series connection of two sets of switch elements in which diodes are anti-parallel connected to IGBTs having no reverse-blocking breakdown voltage. The bidirectional switch element illustrated in FIG. 2D is configured by replacing the IGBTs in the bidirectional switch element illustrated in FIG. 2C by MOSFETs (Metal Oxide Semiconductor Field Effect Transistors).

The inverter circuit 4 and the bidirectional switch circuit 100 make up a power conversion circuit for generating AC voltage that is supplied to the load 6. The power conversion circuit operates in such a manner that any one element from among the switching elements Q1, Q2 and the bidirectional switch element S1 is selected and turned on, and the other two elements are turned off.

When the switching element Q1 is on, positive voltage of the DC power source Psp is outputted to the AC output terminal U. When the switching element Q2 is turned on, negative voltage of the DC power source Psn is outputted to the AC output terminal U. When the bidirectional switch element S1 is turned on, R terminal voltage of the AC power source 1 is outputted to the AC output terminal U. That is, the power conversion circuit can output, to the AC output terminal U, voltage of any one level from among three levels of voltage, namely the positive voltage of the DC power source Psp, the negative voltage of the DC power source Psn, and the R terminal voltage of the AC power source 1, through selection and turning-on of any one element from among the switching elements Q1, Q2, and the bidirectional switch element S1.

The filter circuit 5 is configured through connection in series of a reactor Lf1 and a capacitor Cf1. The filter circuit 5 is connected between the AC output terminal U and the AC output terminal V (hereafter, between the AC output terminals U and V). The load 6 is connected to both ends of the capacitor Cf1. The filter circuit 5 removes a harmonic component from the AC output voltage Vus that is outputted between the AC output terminals U and V. The voltage outputted from the filter circuit 5 is supplied to the load 6.

A control circuit 200 divides the period of a below-described AC output voltage command into a plurality of control periods. At each control period, the control circuit 200 generates control signals G1, G2 for turning on and off the switching elements Q1, Q2, and control signals Gs1, GS2 for turning on and off the bidirectional switch element S1. Each control period is a continuous period having a pre-established time width.

The length of the control period for controlling the turning on and off of the switching elements Q1, Q2 and the bidirectional switch element S1 will be referred to hereafter as a switching period T.

The switching frequency determined by the switching period T may be a sufficiently high frequency with respect to the frequency of the AC output voltage command. For instance, the switching frequency may be 1 kHz or higher in a case where the frequency of the AC output voltage command is a commercial frequency. The switching period T need not necessarily be synchronized with one period of the AC output voltage command, and may be asynchronous therewith.

Figures 3, 4:
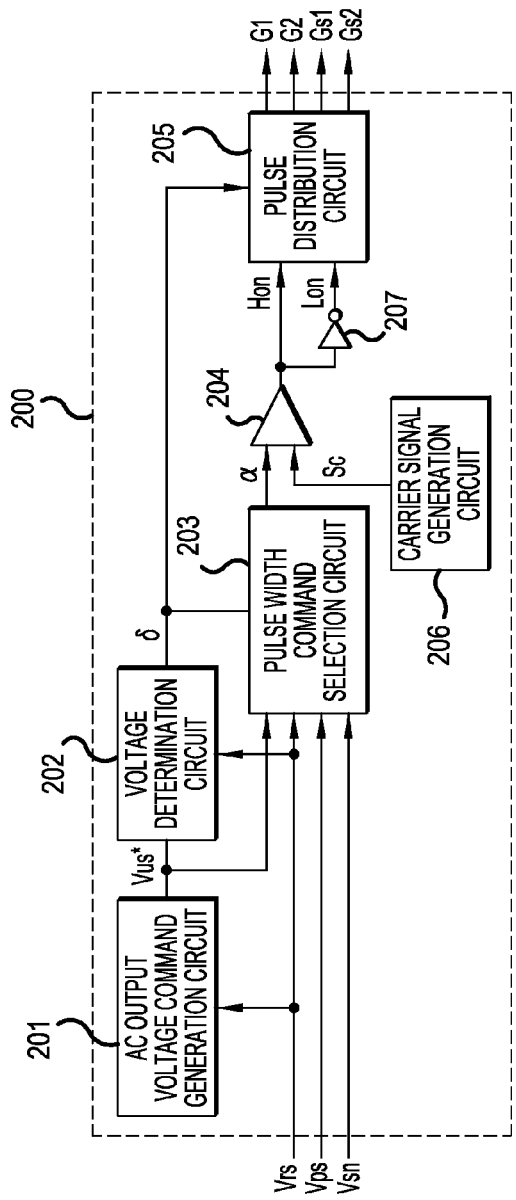
FIG. 3 is a block diagram for explaining the operation of a control circuit.
FIG. 4 is a diagram for explaining the relationship between domain determination, a pulse width command α, and element selection.

FIG. 3 is a block diagram for explaining the operation whereby the control circuit 200 generates control signals. The control circuit 200 receives a voltage Vrs of the AC power source 1 as detected by a voltage detector 301, a voltage Vps of the DC power source Psp as detected by a voltage detector 302, and a voltage Vns of the DC power source Psn as detected by a voltage detector 303. On the basis of relationships between these three voltages, the control circuit 200 generates the control signals G1, G2 for controlling the turning on and off of the switching elements Q1, Q2, and the control signals Gs1, GS2 for controlling the turning on and off of the bidirectional switch element S1.

Specifically, the control circuit 200 generates the control signals G1, G2 and the control signals Gs1, Gs2 as described below.

An AC output voltage command generation circuit 201 generates an AC output voltage command Vus* on the basis of the voltage Vrs of the AC power source 1. For instance, the AC output voltage command Vus* is synchronized with the voltage Vrs of the AC power source 1, and has an amplitude identical to that of the voltage rating of the AC power source 1.

The AC output voltage command Vus* can be set to an AC output voltage command that is asynchronous with the voltage Vrs of the AC power source 1. The AC output voltage command Vus* can be set to an AC output voltage command having an amplitude different from that of the voltage rating of the AC power source 1.

The voltage Vrs of the AC power source 1 and the AC output voltage command Vus* are inputted to a voltage determination circuit 202. The voltage determination circuit 202 outputs a domain signal δ to which the corresponding switching period T belongs, using the voltage Vrs of the AC power source 1 and the AC output voltage command Vus*. The domain signal δ is classified into domains 1 to 6.

FIG. 4 is a diagram for explaining the relationship between domain determination performed by the control circuit 200, a pulse width command α, and element selection. When the relationship between the AC output voltage command Vus* and the voltage Vrs of the AC power source 1 is Vus*≤Vrs, the voltage determination circuit 202 determines the switching period T to be domain 1.

When the relationship between the AC output voltage command Vus* and the voltage Vrs of the AC power source 1 is Vus*>Vrs, the voltage determination circuit 202 determines the switching period T to be domain 2.

In each domain, one element from among the three elements is selected as an H-arm element and another element is selected as an L-arm element. The remaining element not having been selected as an H-arm element or an L-arm element constitutes an off-state arm element.

The H-arm element is an element that by being turned on can output, to the AC output terminal U, a voltage (first voltage), from among the three levels of voltage, that is equal to or higher than the AC output voltage command Vus* and that is closest to the AC output voltage command Vus*. The H-arm element is on during a time (H-arm on-state time) corresponding to the below-described pulse width command α.

The L-arm element is an element that, by being turned on, allows outputting, to the AC output terminal U, the voltage Vrs (second voltage) of the terminal R of the AC power source 1. Therefore, the bidirectional switch element S1 is constantly selected as the L-arm element. The L-arm element is on during a time (L-arm on-state time) resulting from subtracting the H-arm on-state time from the switching period T.

Within the switching period T, the off-state arm element is constantly off. Returning to FIG. 3, the pulse width command selection circuit 203 receives the voltage Vrs of the AC power source 1, the voltage Vps of the DC power source Psp, the voltage Vns of the DC power source Psn, the AC output voltage command Vus* and the domain signal δ. On the basis of these input signals, the pulse width command selection circuit 203 computes the pulse width command α (ratio of on-state time with respect to the switching period T) for the H-arm element.

The pulse width command α in domains 1 and 2 is worked out based on the following expressions:

$$\text{Pulse width command } \alpha \text{ in domain } 1 \alpha = (Vus^* - Vrs)/(Vns - Vrs) \quad (1)$$

$$\text{Pulse width command } \alpha \text{ in domain } 2 \alpha = (Vus^* - Vrs)/(Vps - Vrs) \quad (2)$$

The comparator 204 receives the pulse width command α and a carrier signal Sc generated by a carrier signal generation circuit 206. The comparator 204 compares the pulse width command α and the carrier signal Sc, and generates a signal Hon for turning on the H-arm element. When the H-arm on-state signal Hon is at a high level, the H-arm element is on for the H-arm on-state time, within the switching period T.

A logic inverter 207 inverts the high level or low level of the H-arm on-state signal Hon to the low level or the high level to generate a signal Lon having the low level or the high level. When the L-arm on-state signal Lon is at a high level, the L-arm element is on for the L-arm on-state time, within the switching period T.

A pulse distribution circuit 205 receives the H-arm on-state signal Hon, the L-arm on-state signal Lon, and the domain signal δ. The pulse distribution circuit 205 distributes the H-arm on-state signal Hon to the control terminal of the H-arm element that is selected in accordance with the domain signal δ. The pulse distribution circuit 205 distributes the L-arm on-state signal Lon to the control terminal of the L-arm element that is selected in accordance with the domain signal δ. The pulse distribution circuit 205 generates then control signals for turning off the off-state arm elements for the duration of the switching period.

As described above, the H-arm element is an element that, by being turned on, can output, between the AC output terminals U and V, a voltage (first voltage), from among the three levels of voltage, that is equal to or higher than the AC output voltage command Vus* and that is closest to the AC output voltage command Vus*. The L-arm element is an element that, by being turned on, can output the voltage Vrs of the AC power source 1 (second voltage) between the AC output terminals U and V.

In domain 1, with reference to FIG. 4, the H-arm element is the switching element Q2, the L-arm element is the bidirectional switch element S1, and the off-state arm element is the switching element Q1. In domain 2, the H-arm element is the switching element Q1, the L-arm element is the bidirectional switch element S1, and the off-state arm element is the switching element Q2.

An explanation follows next, with reference to FIG. 5 and FIG. 6, on the relationship between the AC output voltage Vus and the turning on and off operations of the three elements within the switching period T. FIG. 5A is a diagram for explaining an AC output voltage Vus outputted between the AC output terminals U and V in domain 1. FIGS. 5B, 5C, and 5D are diagrams for explaining the operations of the switching elements Q1, Q2 and the bidirectional switch element S1 in this domain.

In this domain, the H-arm element is the switching element Q2. The L-arm element is the bidirectional switch element S1. The off-state arm element is the switching element Q1. Accordingly, the switching element Q2 is on for the on-time $T_{H1}$ (FIG. 5C). Thereafter, the bidirectional switch element S1 is on for the on-time $T_{L1}$, (FIG. 5D). Herein, the switching element Q1 is off (FIG. 5B).

The on-time $T_{H1}$ is a time calculated for the switching period T, on the basis of the pulse width command α worked out based on Expression (1). The on-time $T_{L1}$ is a time resulting from subtracting the on-time $T_{H1}$ from the switching period T.

When the switching element Q2 is on, the voltage Vns of the DC power source Psn, being the first voltage, is outputted between the AC output terminals U and V. When the bidirectional switch element S1 is on, the voltage Vrs of the AC power source 1, which is the second voltage, is outputted between the AC output terminals U and V (FIG. 5A). The average value of the voltage that is outputted between the AC output terminals U and V is equal to the AC output voltage command Vus*.

The voltages that are outputted within the switching period T may be the second voltage and the first voltage, in this order. The same applies to the explanation hereafter.

FIG. 6A is a diagram for explaining a positive AC output voltage Vus outputted between the AC output terminals U and V in domain 2. FIGS. 6B, 6C, and 6D are diagrams for explaining the operations of the switching elements Q1, Q2 and the bidirectional switch element S1 in this domain.

In this domain, the H-arm element is the switching element Q1. The L-arm element is the bidirectional switch element S1. The off-state arm element is the switching element Q2. Accordingly, the switching element Q1 is on for the on-time $T_{H2}$ (FIG. 6B). Thereafter, the bidirectional switch element S1 is on for the on-time $T_{L2}$ (FIG. 6D). The switching element Q2 is off (FIG. 6C).

The on-time $T_{H2}$ is a time calculated for the switching period T, on the basis of the pulse width command α worked out based on Expression (2). The on-time $T_{L2}$ is a time resulting from subtracting the on-time $T_{H2}$ from the switching period T.

When the switching element Q1 is on, the voltage Vps of the DC power source Psp, being the first voltage, is outputted between the AC output terminals U and V. When the bidirectional switch element S1 is on, the voltage Vrs of the AC power source 1, being the second voltage, is outputted between the AC output terminals U and V (FIG. 6A). The average value of the voltage that is outputted between the AC output terminals U and V is equal to the AC output voltage command Vus*.

As described above, the power conversion circuit according to the present embodiment selects the H-arm element and L-arm element that are necessary in order to generate the AC output voltage Vus that is equal to the AC output voltage command Vus*, at each switching period. The power conversion circuit according to the present embodiment turns on, for a respective predefined time, the H-arm element and the L-arm element, within the switching period T; thereby, voltage such that the average voltage thereof is equal to the AC output voltage command Vus* can be generated between the AC output terminals U and V.

That is, the power converter according to the present embodiment can maintain the AC output voltage Vus that is supplied to the load 6 at the AC output voltage command Vus*, by using the voltage Vrs of the AC power source 1 and the voltages Vps, Vns of the DC power source series circuit 30.

The power converter according to the present embodiment cannot output voltage that is higher than the voltage Vps of the DC power source Psp or voltage that is lower than the voltage Vns of the DC power source Psn. Accordingly, it is appropriate to perform a protective operation, which involves for instance turning off all elements, when the AC output voltage command Vus* is higher than the voltage Vps of the DC power source Psp, or when the AC output voltage command Vus* is lower than the voltage Vns of the DC power source Psn.

The switching element Q1 may be maintained constantly in an on-state when the AC output voltage command Vus* is higher than the voltage Vps of the DC power source Psp. The switching element Q2 may be maintained constantly in an on-state when the AC output voltage command Vus* is lower than the voltage Vns of the DC power source Psn.

Figure 10:
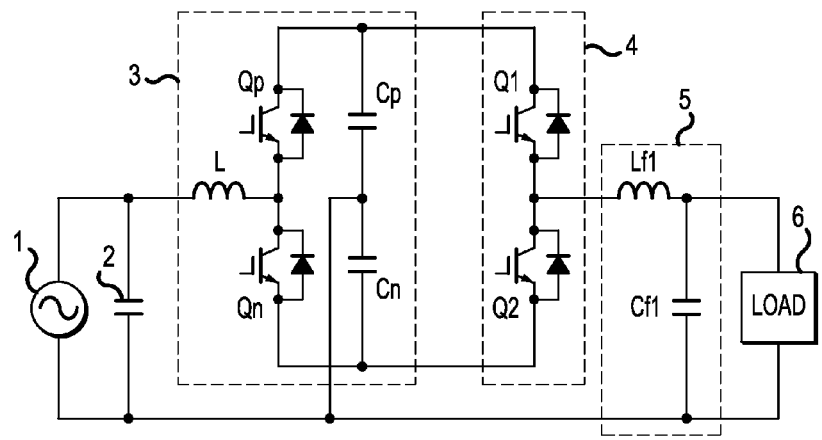
FIG. 10 is a diagram for explaining a conventional power converter.
Figure 11:
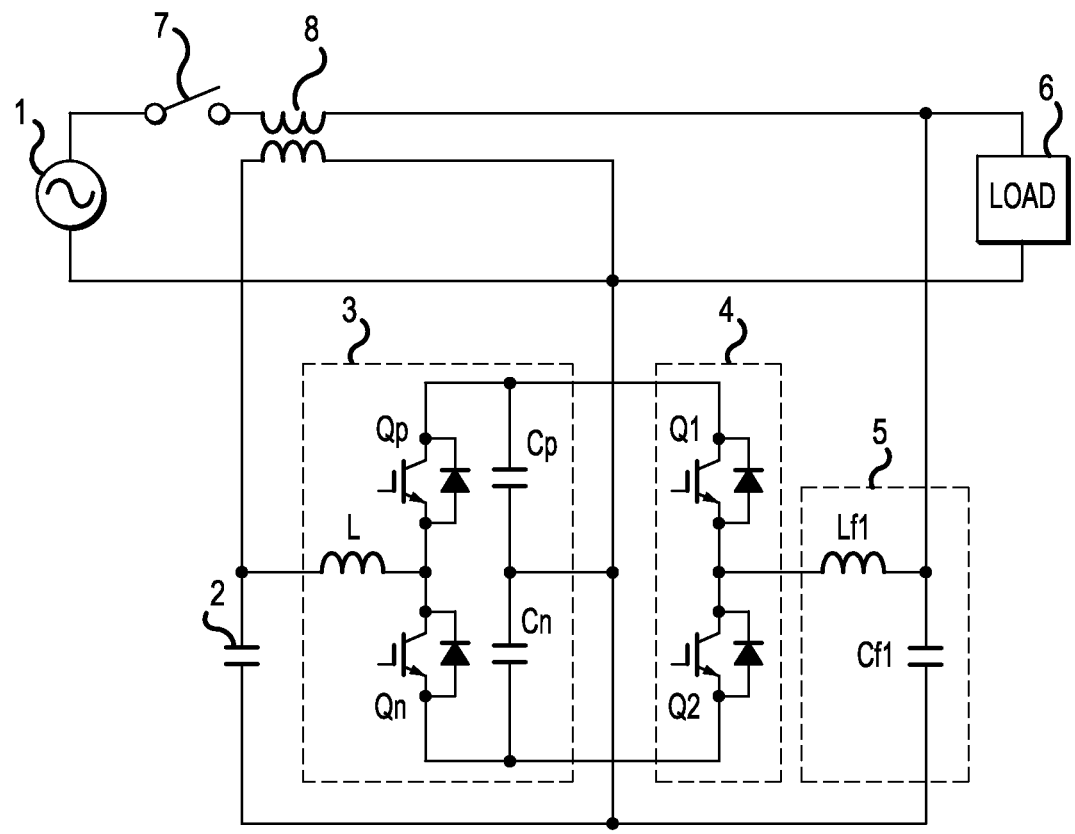
FIG. 11 is a diagram for explaining a conventional power converter.

In the power converter illustrated in FIG. 10, the turning on and off operations of the switching elements of the inverter circuit are performed between the positive-side voltage and the negative-side voltage of the DC power source series circuit. In the power converter according to the present embodiment, however, the turning on and off operations of the switching elements and bidirectional switch elements are performed between the first voltage and the second voltage. As described above, the first voltage is a voltage equal to or higher than the AC output voltage command Vus* and closest to the AC output voltage command Vus*. The second voltage is the voltage Vrs of the AC power source 1 and is closest to the AC output voltage command Vus*. As FIG. 5 and FIG. 6 make clear, the voltage difference between the first voltage and the second voltage is smaller than the voltage difference between the voltage Vps and the voltage Vns of the DC power source.

Therefore, the switching losses that occur upon turning on and turning off of the switching elements of the inverter circuit 4 according to the present embodiment are smaller than the switching losses of the switching elements of the power converter illustrated in FIG. 10. Similarly, the switching losses that occur upon turning on and turning off of the bidirectional switch elements of the bidirectional switch circuit 100 according to the present embodiment are smaller than the switching losses of the switching elements of the power converter illustrated in FIG. 10.

That is, the switching loss in the power converter according to the present embodiment can be made smaller than that of the inverter circuit 4 illustrated in FIG. 10 when the switching frequency of the power converter according to the present embodiment is set to the same switching frequency as that of the inverter circuit 4 illustrated in FIG. 10.

In particular, the AC output voltage Vus may be synchronized with the voltage Vrs of the AC power source 1. Synchronizing the AC output voltage Vus to the voltage Vrs of the AC power source 1 makes it possible to further reduce the voltage that is applied to the switching elements Q1, Q2 and the bidirectional switch element S1. The switching loss incurred by these elements can be further reduced as a result.

The AC output voltage Vus of the power converter according to the present embodiment varies between the first voltage and the second voltage. The voltage applied to the reactor Lf1 is accordingly smaller.

Ripple current flowing in the reactor Lf1 is proportional to the voltage time product (voltage variation range×voltage pulse width), and inversely proportional to the inductance value. For the same inductance value, the voltage time product is smaller in the power converter of the present embodiment, and the ripple current flowing in the reactor Lf1 is accordingly smaller. A smaller ripple current entails a smaller loss (mainly iron loss) in the reactor Lf1, and it becomes therefore possible to reduce loss in the reactor Lf1.

The inductance value of the reactor Lf1 can be reduced when ripple currents are set to be identical. The size of the reactor Lf1 can be reduced in such a case.

Even upon occurrence of power failure in the AC power source 1, the H-arm element and the L-arm element in the power converter of the present invention can be selected at each switching period T, in accordance with the same logical process as when the AC power source 1 is in a normal condition. The AC output voltage Vus can be maintained at the AC output voltage command Vus* through turning on and off of the selected H-arm element and L-arm element in the same way as when the AC power source 1 is in a normal condition.

In the power converter according to this embodiment, control for maintaining the AC output voltage Vus at the AC output voltage command Vus* requires therefore no means for detecting a power failure in the AC power source 1.

FIG. 7 is a diagram for explaining another relationship between domain determination performed by the control circuit 200, the pulse width command α, and element selection. FIGS. 8A, 8B, 8C, and 8D are diagrams for explaining the AC output voltage Vus in domain 3, and the operations of the switching elements Q1, Q2 and the bidirectional switch element S1.

The configuration of the control circuit 200 is identical to that of the control circuit illustrated in FIG. 3. Herein, however, the voltage determination circuit 202 determines also domain 3 in addition domains 1 and 2 illustrated in FIG. 4. Domain 3 is a domain for outputting voltage of the AC power source 1 between the AC output terminals U and V.

The explanation hereafter with reference to FIG. 3, FIG. 7 and FIG. 8 will focus on the operation of the control circuit 200 for domain 3, and portions shared with domains 1 and 2 explained above will be omitted as appropriate.

The AC output voltage command Vus* and the voltage Vrs of the AC power source 1 are inputted at each switching period, to the voltage determination circuit 202. The voltage determination circuit 202 determines the switching period to be domain 3 when the relationship between the two voltages satisfies the condition $|Vus^*-Vrs|<\Delta Vus^*$. The voltage determination circuit 202 outputs then a domain signal δ denoting domain 3.

Herein, $\Delta Vus^*$ is a reference quantity for determining that the value of the voltage Vrs of the AC power source 1 lies within a predefined range with respect to the value of the AC output voltage command Vus*. In a case where the load 6 allows for a fluctuation of the input voltage within a range of AC output voltage command Vus*±10%, the reference quantity $\Delta Vus^*$ is equivalent to 10% of the AC output voltage command Vus*. The reference quantity $\Delta Vus^*$ may be established in accordance with some other condition.

Upon input of a domain signal δ denoting domain 3, the pulse width command selection circuit 203 fixes the pulse width command α to 0.0. When the pulse width command α is 0.0, the comparator 204 generates the signal Lon for turning on the L-arm element throughout the switching period T, regardless of the magnitude of the carrier signal Sc. In the switching period T, thus, the L-arm on-state signal Lon is constantly at a high level and the H-arm on-state signal Hon is constantly at a low level.

Upon input of the domain signal δ denoting domain 3, the pulse distribution circuit 205 sets the bidirectional switch element S1 as the L-arm element. The pulse distribution circuit 205 sets the switching elements Q1, Q2 as the off-state arm elements. Accordingly, the pulse distribution circuit 205 outputs control signals Gs1, Gs2 of the bidirectional switch element S1 that are at a high level during the switching period T, and control signals G1, G2 of the switching elements Q1, Q2 that are at a low level during the switching period T.

Therefore, the bidirectional switch element S1 is on and the switching elements Q1, Q2 are off during the switching period T determined to be domain 3. The voltage Vrs of the AC power source 1 is outputted thus between the AC output terminals U and V through the operation of the three elements.

Also in the case where the AC output voltage command Vus* has negative polarity, the control circuit 200 performs the same operations as in the case where the AC output voltage command Vus* has positive polarity.

In the switching period T determined to be domain 3, only the bidirectional switch element S1 is on, while the switching elements Q1, Q2 are off. Accordingly, only the bidirectional switch element S1 incurs conduction loss on account of current application. No conduction loss occurs in the switching elements Q1, Q2, since no current flows through these. Moreover, there occurs no switching loss, since none of the elements undergoes an on or off operation. Therefore, power loss can be further reduced by providing domain 3 in the operation of the power conversion circuit.

Figure 9:
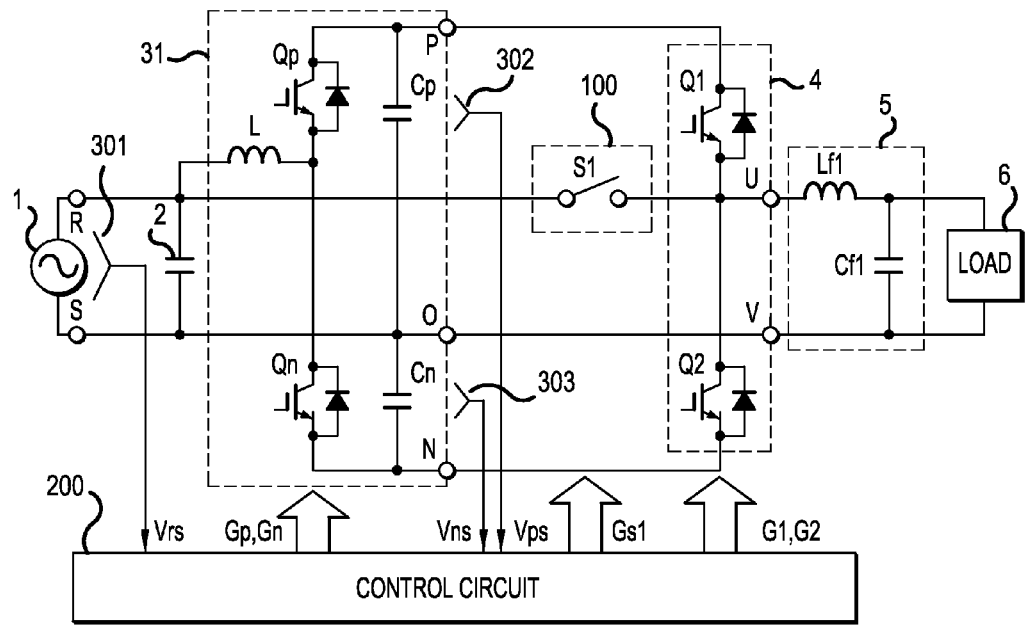
FIG. 9 is a circuit diagram according to an embodiment of the present invention.

Next, FIG. 9 is a diagram for explaining another embodiment of the power converter of the present invention. The power converter according to the present embodiment is configured by using a half-bridge converter circuit 31 as the DC power source series circuit 30 of the embodiment illustrated in FIG. 1.

The converter circuit 31 has, as main constituent elements, a series circuit of a positive-side switching element Qp and a negative-side switching element Qn, a series circuit of a positive-side capacitor Cp and a negative-side capacitor Cn, and a reactor L. One end of the reactor L is connected to the terminal R of the AC power source 1, and the other end is connected to a connection midpoint of the switching elements Qp, Qn. The series circuit of the capacitors Cp, Cn is connected in parallel to the series circuit of the switching elements Qp, Qn. The connection midpoint O of the capacitors Cp, Cn is connected to the terminal S of the AC power source 1, and is also connected to the AC output terminal V.

When the voltage of the AC power source 1 has positive polarity with respect to the AC output terminal V, firstly, the switching element Qn is turned on, and the switching element Qp is turned off. Through turning-on of the switching element Qn, voltage resulting from adding the voltage of the capacitor Cn and the voltage of the AC power source 1 is applied to the reactor L, and energy accumulates in the reactor L. Next, the switching element Qn is turned off and the switching element Qp is turned on. When the switching element Qn is turned off, the energy accumulated in the reactor L is charged to the capacitor Cp.

When the voltage of the AC power source 1 has negative polarity with respect to the AC output terminal V, firstly, the switching element Qp is turned on, and the switching element Qn is turned off. Through turning-on of the switching element Qp, a voltage resulting from adding the voltage of the capacitor Cp and the voltage of the AC power source 1 is applied to the reactor L, and energy accumulates in the reactor L. Next, the switching element Qp is turned off, and the switching element Qn is turned on. When the switching element Qp is turned off, the energy accumulated in the reactor L is charged to the capacitor Cn.

The on-off operations of the switching elements Qp, Qn are performed at a frequency that is sufficiently higher than the frequency of the AC power source 1. Through the on-off operations of the switching elements Qp, Qn, the voltage of the capacitor Cp and the capacitor Cn is maintained at a predefined voltage that is higher than the voltage of the AC power source 1.

The DC power source series circuit 30 of the power converter of the present invention can be configured thus in the form of a half-bridge converter 31. The capacitor Cp of the half-bridge converter 31 corresponds to the positive-side DC power source Psp of the DC power source series circuit 30. The capacitor Cn of the half-bridge converter 31 corresponds to the negative-side DC power source Psn of the DC power source series circuit 30.

In the present embodiment, the action and effect of circuits other than the half-bridge converter 31 are identical to the action and effect of the power converter according to the first embodiment explained with reference to FIG. 1 through FIG. 8.

The invention claimed is:

1. A power converter that outputs AC voltage on the basis of an AC output voltage command, comprising:
    a single-phase AC power source having a first AC terminal and a second AC terminal;
    a DC power source series circuit comprising a first DC power source and a second DC power source connected in series such that a neutral terminal is connected to the second AC terminal, the neutral terminal being a connection point of the first DC power source and the second DC power source;
    a switching element series circuit comprising a positive-side switching element connected to a positive-side terminal of the DC power source series circuit, and a negative-side switching element connected to a negative-side terminal of the DC power source series circuit;
    a first AC output terminal connected to a connection point of the positive-side switching element and the negative-side switching element;
    a second AC output terminal connected to the neutral terminal; and
    a bidirectional switch element, a first end of the bidirectional switch element being connected to the first AC output terminal and a second end of the bidirectional switch element being connected to the first AC terminal,
    wherein at each control period resulting from dividing one period of the AC output voltage command into a plurality of control periods each having a time width, the power converter is configured to set, as a first voltage, a voltage of one level selected from among three levels of voltage of a positive-side voltage of the DC power source series circuit, a negative-side voltage of the DC power source series circuit, and a voltage of the AC power source, to set, as a second voltage, the voltage of another level selected from among the three levels of voltage, and to output the first voltage and the second voltage to the first AC output terminal, over respective time widths.

2. The power converter according to claim 1, wherein the first voltage and the second voltage are voltages selected on the basis of the AC output voltage command and the voltage of the AC power source.

3. The power converter according to claim 2, wherein an output time of the first voltage is established on the basis of the AC output voltage command, the first voltage, and the second voltage, and
    an output time of the second voltage is a time resulting from subtracting the output time of the first voltage from the time of each control period.

4. The power converter according to claim 2, wherein an output time of the first voltage is a time corresponding to a value obtained by dividing a difference in voltage between the AC output voltage command and the second voltage by a difference in voltage between the first voltage and the second voltage, and
    an output time of the second voltage is a time resulting from subtracting the output time of the first voltage from the time of each control period.

5. The power converter according to claim 2, wherein an average value of the AC voltage that is outputted within each control period is equal to an average value of the AC output voltage command within that control period.

6. The power converter according to claim 1, wherein the AC output voltage command is synchronized with the voltage of the AC power source.

7. The power converter according to claim 6, wherein the power converter is further configured to output the voltage of the AC power source to the first AC output terminal in a control period in which a deviation between the voltage of the AC power source and the AC output voltage command lies within a pre-established range.

8. The power converter according to claim 1, wherein the AC output voltage command is asynchronous with the voltage of the AC power source.

9. The power converter according to claim 8, wherein the power converter is further configured to output the voltage of the AC power source to the first AC output terminal in a control period in which a deviation between the voltage of the AC power source and the AC output voltage command lies within a pre-established range.

10. A power converter that outputs AC voltage on the basis of an AC output voltage command, comprising:
    a single-phase AC power source having a first AC terminal and a second AC terminal;
    a DC power source series circuit comprising a first DC power source and a second DC power source connected in series such that a neutral terminal is connected to the second AC terminal, is the neutral terminal being a connection point of the first DC power source and the second DC power source;
    a switching element series circuit comprising a positive-side switching element connected to a positive-side terminal of the DC power source series circuit, and a negative-side switching element connected to a negative-side terminal of the DC power source series circuit;
    a first AC output terminal connected to a connection point of the positive-side switching element and the negative-side switching element;
    a second AC output terminal connected to the neutral terminal; and
    a bidirectional switch element, a first end of the bidirectional switch element being connected to the first AC output terminal and a second end of the bidirectional switch element being connected to the first AC terminal,
    wherein at each control period resulting from dividing one period of the AC output voltage command into a plurality of control periods each having a time width,
    the power converter is configured to select, as a first voltage, a negative voltage of the DC power source series circuit, and select, as a second voltage, a voltage of the AC power source, when the AC output voltage command is equal to or lower than the voltage of the AC power source,
    the power converter is configured to select, as the first voltage, a positive voltage of the DC power source series circuit, and select, as the second voltage, the voltage of the AC power source, when the AC output voltage command is higher than the voltage of the AC power source, and
    to output the first voltage and the second voltage to the first AC output terminal, over respective time widths.

11. The power converter according to claim 10, wherein an output time of the first voltage is established on the basis of the AC output voltage command, the first voltage, and the second voltage, and
    an output time of the second voltage is a time resulting from subtracting the output time of the first voltage from the time of each control period.

12. The power converter according to claim 10, wherein an output time of the first voltage is a time corresponding to a value obtained by dividing a difference in voltage between the AC output voltage command and the second voltage by a difference in voltage between the first voltage and the second voltage, and
    an output time of the second voltage is a time resulting from subtracting the output time of the first voltage from the time of each control period.

13. The power converter according to claim 10, wherein an average value of the AC voltage that is outputted within each control period is equal to an average value of the AC output voltage command within that control period.

14. The power converter according to claim 10, wherein the AC output voltage command is synchronized with the voltage of the AC power source.

15. The power converter according to claim 14, wherein the power converter is further configured to output the voltage of the AC power source to the first AC output terminal in a control period in which a deviation between the voltage of the AC power source and the AC output voltage command lies within a pre-established range.

16. The power converter according to claim 10, wherein the AC output voltage command is asynchronous with the voltage of the AC power source.

17. The power converter according to claim 16, wherein the power converter is further configured to output the voltage of the AC power source to the first AC output terminal in a control period in which a deviation between the voltage of the AC power source and the AC output voltage command lies within a pre-established range.

* * * * *

UNITED STATES PATENT AND TRADEMARK OFFICE
CERTIFICATE OF CORRECTION

PATENT NO. : 9,692,310 B2
APPLICATION NO. : 14/453804
DATED : June 27, 2017
INVENTOR(S) : Satoru Fujita et al.

It is certified that error appears in the above-identified patent and that said Letters Patent is hereby corrected as shown below:

Add the following references under Item (56) "References Cited":

U.S. PATENT DOCUMENTS

| | | |
|---|---|---|
| 5,099,410 A | 03/1992 | DIVAN |
| 2012/0044728 A1 | 02/2012 | YATSU, et al. |
| 2013/0235625 A1 | 09/2013 | YAMADA |

FOREIGN PATENT DOCUMENTS

| | |
|---|---|
| JP 04289782 A | 10/1992 |
| JP 02168867 A | 06/1990 |
| JP 2012044824 A | 03/2012 |
| WO 2012067167 A1 | 05/2012 |
| JP 11178216 A | 07/1999 |
| JP 07337036 A | 12/1995 |
| JP 10075581 A | 03/1998 |
| JP 2006296098 A | 10/2006 |

OTHER PUBLICATIONS

International Search Report for PCT/JP2012/003856, mail date September 18, 2012.
International Search Report PCT/JP2012/004394, dated October 9, 2012. Cited in U.S. pending related application 14/454,284.
Extended Search Report issued in European Appln. No. 12871560.4 mailed March 11, 2016.

Signed and Sealed this
Second Day of January, 2018

Joseph Matal
*Performing the Functions and Duties of the
Under Secretary of Commerce for Intellectual Property and
Director of the United States Patent and Trademark Office*